United States Patent [19]
Ohtaki

[11] Patent Number: 6,097,679
[45] Date of Patent: Aug. 1, 2000

[54] METHOD FOR CONTROLLING DISK-TYPE STORAGE DEVICE

[75] Inventor: Toshiyuki Ohtaki, Yamagata, Japan

[73] Assignee: Samsung Electronics Co., Ltd., Rep. of Korea

[21] Appl. No.: 09/019,639

[22] Filed: Feb. 6, 1998

[30] Foreign Application Priority Data

Feb. 6, 1997 [JP] Japan ................................ 9-023679

[51] Int. Cl.[7] ........................................... G11B 7/00
[52] U.S. Cl. ........................... 369/50; 369/58; 369/54
[58] Field of Search ............................. 369/54, 47, 48, 369/49, 50, 53, 58, 59, 32

[56] References Cited

U.S. PATENT DOCUMENTS

| | | | |
|---|---|---|---|
| 5,442,608 | 8/1995 | Umeda et al. | 369/48 X |
| 5,544,138 | 8/1996 | Bajorek et al. | 369/54 |

*Primary Examiner*—Muhammad Edun
*Attorney, Agent, or Firm*—Dilworth & Barrese

[57] ABSTRACT

A method is provided for controlling a disk-type storage device that performs reading and writing operations according to a process command from a data processing unit while rotating a disk-type recording medium at a specified rotation speed. The method according to an embodiment of the invention includes the step of setting an intermediate standby mode that rotates the recording medium at a slower rotation speed than the specified rotation speed when a time duration within which no process command has been issued exceeds a first reference time period. The method also includes the step of setting a standby mode for stopping the rotation of the recording medium when a connect time of the intermediate standby mode exceeds a second reference time period.

4 Claims, 1 Drawing Sheet

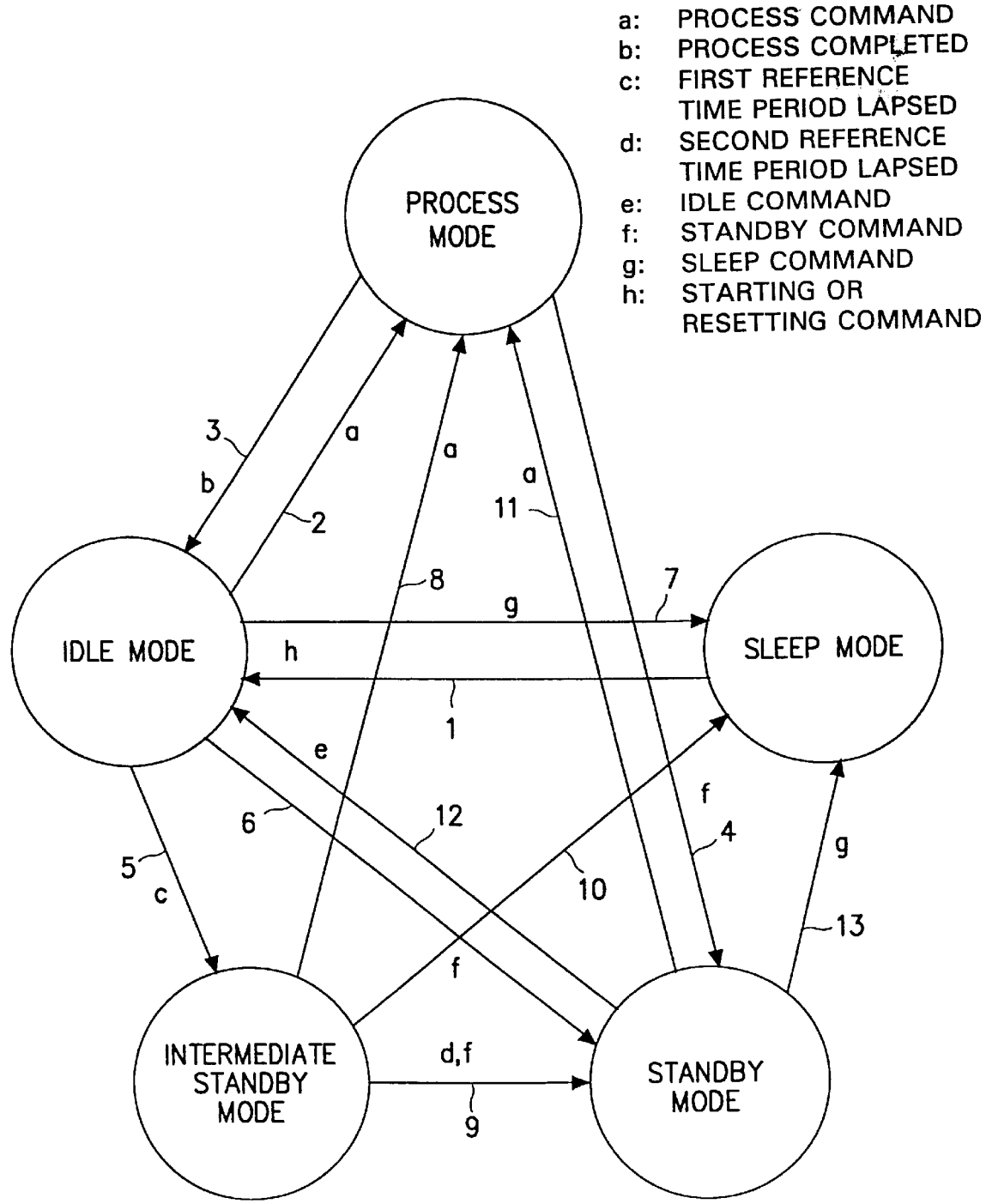

METHOD FOR CONTROLLING DISK-TYPE STORAGE DEVICE

BACKGROUND OF THE INVENTION

1. Field of the Invention

The present invention relates to memory devices and more particularly, to a method for controlling a disk-type storage device.

2. Description of the Related Art

An optical disk drive is a typical disk-type storage device that uses an optical disc as the storage medium. The optical disk is rotated at given revolution speed (i.e., a given number of revolutions per minute) while an optical-pick-up reads from or writes to the optical disk in response to commands from a data processing unit. The optical disk revolution speed is about 200 rpm for a 4× (i.e., 4 speed) system and about 4000 for an 8× (i.e., 8 speed) system.

Generally, after completing a current process (e.g., reading, writing), the disk drive operating mode transitions from a process mode to an idle mode, thereby standing ready to respond to the next process command while maintaining the specified normal rotation speed. When the duration of the idle mode exceeds a specified reference time period without receiving a further process command, the disk drive automatically transitions to a standby mode. In the standby mode, disk rotation is stopped until a new process command is received. Thus, in order to transition from the standby mode to the process mode, the motor that rotates the disk must be restarted. Additionally, a sleep mode may be initiated by a sleep command from the data processing unit. When the disk drive is in sleep mode, process commands from the data processing unit are ineffective. The sleep mode may be released, but only after the disk drive is restarted or reset.

The purpose of controlling the disk storage device by application of the idle, standby, and sleep modes is to prevent unnecessary power consumption and heat generation, and to promptly respond to process commands from the data processing unit. However, the conventional method of selecting between the idle mode, that rotates the disk drive motor at normal speed, and the standby mode, that requires the restarting of the disk drive motor when a process command is issued, is inadequate in preventing unnecessary power consumption and heat generation.

SUMMARY OF THE INVENTION

It is an object of the present invention to provide a method for controlling the disk-type storage device that enables prompt response to process commands, efficient suppression of unnecessary power consumption, and effective control of heat generation.

To achieve the above and other objects, a method for controlling a disk-type storage device is provided. The method according to an embodiment of the invention is described below.

In a disk-type storage device, when the duration of a non-processing state (i.e., no process command is issued and the storage medium is rotating at a specified rotation speed) exceeds a preset first reference time period, the disk operating mode is changed to an intermediate standby mode. In the intermediate standby mode, the device is rotating the disk at a slower rotation speed than the specified rotation speed so that the device is standing ready to respond to process commands. When the duration of the intermediate standby mode exceeds a preset second reference time period, the device operating mode is changed to a standby mode. In the standby mode, the rotation of the disk-type storage medium is stopped.

Therefore, the method of the present invention is characterized by an intermediate standby mode set between the idle and standby modes of the conventional method for controlling a disk-type storage device. The first reference time period for transitioning from the idle mode to the intermediate mode is set shorter than the reference standby interval in the conventional method. The intermediate mode follows the idle mode which rotates the disk at a predetermined revolution speed, and precedes the standby mode which stops the rotation of the disk. Accordingly, since the intermediate standby mode continues to rotate the disk, although at a slower revolution speed than that of the idle mode, the present invention advantageously provides effective suppression of power consumption and heat generation, while allowing prompt responses to new process commands. This is achieved without having to restart the disk driving motor as required by the conventional method's transition directly from the idle mode to the standby mode.

These and other objects, features and advantages of the present invention will become apparent from the following detailed description of illustrative embodiments thereof, which is to be read in connection with the accompanying drawing, in which like reference symbols indicate the same or similar components.

BRIEF DESCRIPTION OF THE DRAWINGS

The FIGURE is a diagram illustrating the transitions between the operating modes of a disk-type storage device according to an embodiment of the present invention.

DETAILED DESCRIPTION OF PREFERRED EMBODIMENTS

The commands and conditions represented by a through h in the FIGURE correspond to respective arrow designations 1 through 13. Referring to the FIGURE, a transition in the operation of an optical disk system from a sleep mode to an idle mode requires a restart or reset command (Arrow 1). The idle mode can transition to any one of a process mode, intermediate standby mode, standby mode or sleep mode in response to a mode changing cause. For example, the idle mode can transition to the process mode in response to a process command by the data processing unit (Arrow 2). When the process according to a process command is completed, the operating mode usually returns to the idle mode from the process mode (Arrow 3). However, in some circumstances other transitions are possible. For example, the process mode can be changed directly to the standby mode in response to a standby command from the data processing unit (Arrow 4). A transition from the idle mode to the intermediate standby mode occurs when the duration of the idle mode exceeds a preset first reference time period (Arrow 5). Likewise, the idle mode may transition to the standby mode (Arrow 6) or the sleep mode (Arrow 7) according to a standby command or a sleep command, respectively.

According to an embodiment of the method of the present invention, the first reference time period is set shorter than the standby reference time period of the conventional control method. However, the first reference time period may be varied according to the main use of the device. For example, when the main use concerns application installation, generally the connect time of process commands and the time duration between process commands (i.e., the time duration of the intermediate standby mode or the standby mode) are long. Thus, the first reference time period is set short, such as, for example, to about 15 seconds. In this case, the proper rotation speed of the disk drive is about 2× speed in contrast with the normal 4×–8× speed. However, when the main use of the device concerns multimedia applications, generally the connect time of process commands and the time durations of the intermediate standby mode and the standby mode are shorter. Thus, the first reference time period is set longer, such as, for example, to about 20 seconds. In this case, the proper rotation speed of the disk drive is about 4× speed.

The maximum connect time of the intermediate standby mode is the preset second reference time period. In the case that the main use of the device concerns application installation, the above second reference time period is set short, such as, for example, to about 30 seconds. However, in the case that the main use of the device concerns multimedia applications, the second reference time period is set a little longer, such as, for example, to about two minutes. When a process command is issued within the second reference time period during the intermediate standby mode, the operating mode transitions to the process mode (Arrow 8). However, if a process command has not issued and the second reference time period has been exceeded, the operating mode transitions to the standby mode (Arrow 9). Also, when the standby command is issued, the operating mode transitions from the intermediate standby mode to the standby mode (Arrow 9), even though the second reference time period has not been exceeded. Moreover, when the sleep command is issued, the operating mode transitions from the intermediate standby mode directly to the sleep mode (Arrow 10). Thus, the operating mode of the storage device is changed from the standby mode to the process mode (Arrow 11) by the process command, to the idle mode (Arrow 12) by the idle command, and to the sleep mode (Arrow 13) by the sleep command.

As described above, the present invention advantageously enables prompt response to a process command. Additionally, the present invention allows for effective suppression of power consumption and heat generation.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for controlling a disk-type storage device, the storage device performing data reading or writing operations according to a process command from a data processing unit while rotating a disk-type recording medium at a specified rotation speed, the method comprising the steps of:

setting an intermediate standby mode that rotates the recording medium at a slower rotation speed than the specified rotation speed when a no process command has been issued within a first reference time period, wherein said first reference time period is calculated based on a current software application type being accessed by said data processing unit to and from the disk-type storage device; and setting a standby mode for stopping the rotation of the recording medium when a connect time of the intermediate standby mode exceeds a second reference time period, wherein said second reference time period is calculated based on the current software application type being accessed by said data processing unit to and from the disk-type storage device.

2. A method for controlling a disk-type storage device, the storage device performing data reading or writing operations according to a process command from a data processing unit while rotating a disk-type recording medium at a specified rotation speed, the method comprising the steps of:

setting the storage device to an intermediate standby mode by rotating the recording medium at a slower rotation speed than the specified rotation speed, said setting based on a current software application type being accessed by said data processing unit to and from the disk-type storage device; and setting the storage device to a standby mode for stopping the rotation of the recording medium when no process command is received, said setting based on the current software application type being accessed by said data processing unit to and from the disk-type storage device.

3. The method of claim 2, wherein the step of setting the storage device to an intermediate standby mode is performed when no process command has been issued within a first reference time period.

4. The method of claim 2, wherein the step of setting the storage device to a standby mode is performed when the duration of the intermediate standby mode exceeds a second reference time period.

* * * * *

UNITED STATES PATENT AND TRADEMARK OFFICE
CERTIFICATE OF CORRECTION

PATENT NO. : 6,097,679
DATED : August 1, 2000
INVENTOR(S) : Toshiyuki Ohtaki It is certified that error appears in the above-identified patent and that said Letters Patent is hereby corrected as shown below:

There is an error with respect to the Foreign Application Priority number:

"9-023679" should be --97-23679--.

Signed and Sealed this

Seventeenth Day of April, 2001

Attest:

NICHOLAS P. GODICI

Attesting Officer   Acting Director of the United States Patent and Trademark Office